United States Patent
Ivankovic et al.

(10) Patent No.: US 8,907,581 B2
(45) Date of Patent: Dec. 9, 2014

(54) METHOD AND CIRCUIT FOR LED DRIVER DIMMING

(71) Applicant: Infineon Technologies North America Corp., Milpitas, CA (US)

(72) Inventors: Mladen Ivankovic, Oakville (CA); Fred Sawyer, Foxboro, MA (US)

(73) Assignee: Infineon Technologies Austria AG, Villach (AT)

( * ) Notice: Subject to any disclaimer, the term of this patent is extended or adjusted under 35 U.S.C. 154(b) by 36 days.

(21) Appl. No.: 13/716,677

(22) Filed: Dec. 17, 2012

(65) Prior Publication Data

US 2014/0167634 A1   Jun. 19, 2014

(51) Int. Cl.
   H05B 37/02 (2006.01)
   H05B 39/04 (2006.01)
   H05B 41/36 (2006.01)

(52) U.S. Cl.
   CPC ................................... H05B 37/02 (2013.01)
   USPC ........... 315/210; 315/215; 315/216; 315/257; 315/287

(58) Field of Classification Search
   None
   See application file for complete search history.

(56) References Cited

U.S. PATENT DOCUMENTS

| 8,193,738 B2 | 6/2012 | Chu et al. | |
| 8,207,687 B1* | 6/2012 | Rhodes | 315/307 |
| 2011/0175543 A1* | 7/2011 | Sun et al. | 315/291 |
| 2012/0176057 A1* | 7/2012 | Koutensky et al. | 315/210 |

* cited by examiner

*Primary Examiner* — Anh Tran
(74) *Attorney, Agent, or Firm* — Murphy, Bilak & Homiller, PLLC

(57) ABSTRACT

An LED driver includes a transformer, current control loop and current adjustment circuit. The primary side of the transformer transfers energy to the secondary side of the transformer responsive to an input signal. The secondary side delivers output current to one or more LEDs at a magnitude corresponding to the amount of energy transferred to the secondary side. The current control loop controls current in the primary side so that the output current equals a reference current signal. The current adjustment circuit injects a current adjustment signal into the current control loop responsive to a phase-cut signal which removes a portion of the input signal. The current control loop also decreases the current in the primary side responsive to the current adjustment signal so that a brightness of each LED connected to the secondary side is decreased by an amount corresponding to the magnitude of the current adjustment signal.

12 Claims, 3 Drawing Sheets

METHOD AND CIRCUIT FOR LED DRIVER DIMMING

TECHNICAL FIELD

The present application relates to LED drivers, in particular LED driver dimming.

BACKGROUND

Many applications for LED (light-emitting diode) based solid-state lighting (SSL) require dimming capabilities. LEDs react instantaneously to changes in power input, making SSL especially appropriate for dimming scenarios. However, LED luminaire designers face a challenge in designing products that work with a variety of legacy dimming-control technologies and in some cases that offer the ability to operate in emerging wireless-network-control scenarios. Luminaire designers must first understand the related but separate concepts of the mechanism used to feed the dimming information into the luminaire, and the technique used to actually reduce the brightness of the LEDs. There are two basic alternatives that can be used to reduce the light output of the LEDs: analog dimming and pulse-width-modulation (PWM) dimming.

Analog dimming simply controls the drive current fed to the LEDs. Full brightness uses the full current. The driver electronics linearly reduces the current to dim the LEDs. Analog dimming can be simple to implement, but may not deliver the best overall performance. The efficiency of LEDs tends to increase at lower currents, but LEDs may not produce a consistent color at lower drive currents.

For PWM dimming, the driver electronics supplies pulses of full-amplitude current to the LEDs. The driver varies the duty cycle of the pulses to control the apparent brightness. PWM dimming relies on the capability of the human eye to integrate the average amount of light in the pulses. Provided the pulse rate is high enough (typically about 200 Hz), the eye does not perceive the pulsing but only the overall average.

For an LED luminaire to respond correctly to a phase-control dimmer, it is necessary to add several functional blocks into the driver electronics. For example, a sensor is typically provided for monitoring the AC input waveform before the power-factor-correction (PFC) stage and generating an output signal proportional to the amount of phase cut. The controller drives the MOSFET switch connected at the input of a DC-DC converter. When no AC phase-cut is detected, the output is driven at 100% duty cycle to give full brightness. AC phase-cutting reduces the lamp brightness by cutting out part of the AC waveform. For example, a forward-phase triac dimmer cuts out a portion of the AC waveform at the leading edge of each half sine wave. In contrast, a reverse-phase dimmer cuts out a portion of the AC waveform at the trailing edge so that the dimmer turns off part-way through the sine wave. In either case, LED dimming is achieved by cutting out part of the AC waveform. It is desirable to reduce the number of components needed to support LED dimming, thereby simplifying the LED driver design and reducing system cost.

SUMMARY

According to the embodiments described herein, LED dimming is enabled by using the length (duration) of the pause (phase-cut) in the input voltage provided to an LED driver to lower current to the LEDs connected to the LED driver.

In one case, a pulse signal is generated on the secondary side of the driver transformer that is proportional to the input voltage pause. This pulse signal is generated by using the duration of the pause of the primary voltage (during phase-cut dimming) as measured on the secondary side. The average value of the pulse signal is subtracted from a current reference signal on the secondary side, the current reference signal being the reference voltage on the secondary side for nominal LED current. The difference is used as a command value provided to the current control loop of the LED driver for adjusting the current to the LEDs.

In another case, the input voltage pause length is measured on the primary side and a corresponding value is injected into the LED driver current control loop. LED current on the secondary side is measured by a current sense transformer, and the current control loop receives both a value for the LED current on the secondary side and a value for the input voltage pause length on the primary side. The current control loop is provided the sum of these two values. When phase-cut is present in the LED driver input voltage, the LED output current is decreased in proportion with the pause duration.

According to an embodiment of an LED driver, the driver comprises a transformer having a primary side and a secondary side. The primary side is operable to transfer energy to the secondary side responsive to an input signal, and the secondary side is operable to deliver output current to one or more LEDs at a magnitude corresponding to the amount of energy transferred to the secondary side. A current control loop of the LED driver is operable to control current in the primary side so that the output current equals a reference current signal. A current adjustment circuit of the LED driver is operable to inject a current adjustment signal into the current control loop responsive to a phase-cut signal which removes a portion of the input signal. The current control loop is further operable to decrease the current in the primary side responsive to the current adjustment signal so that a brightness of each LED connected to the secondary side is decreased by an amount corresponding to the magnitude of the current adjustment signal.

According to an embodiment of a method of operating an LED driver, the method comprises: transferring energy from a primary side of a transformer to a secondary side of the transformer responsive to an input signal so that the secondary side delivers output current to one or more LEDs at a magnitude corresponding to the amount of energy transferred to the secondary side; controlling current in the primary side by a current control loop so that the output current equals a reference current signal; injecting a current adjustment signal into the current control loop responsive to a phase-cut signal which removes a portion of the input signal; and decreasing the current in the primary side responsive to the current adjustment signal so that a brightness of each LED connected to the secondary side is decreased by an amount corresponding to the magnitude of the current adjustment signal.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
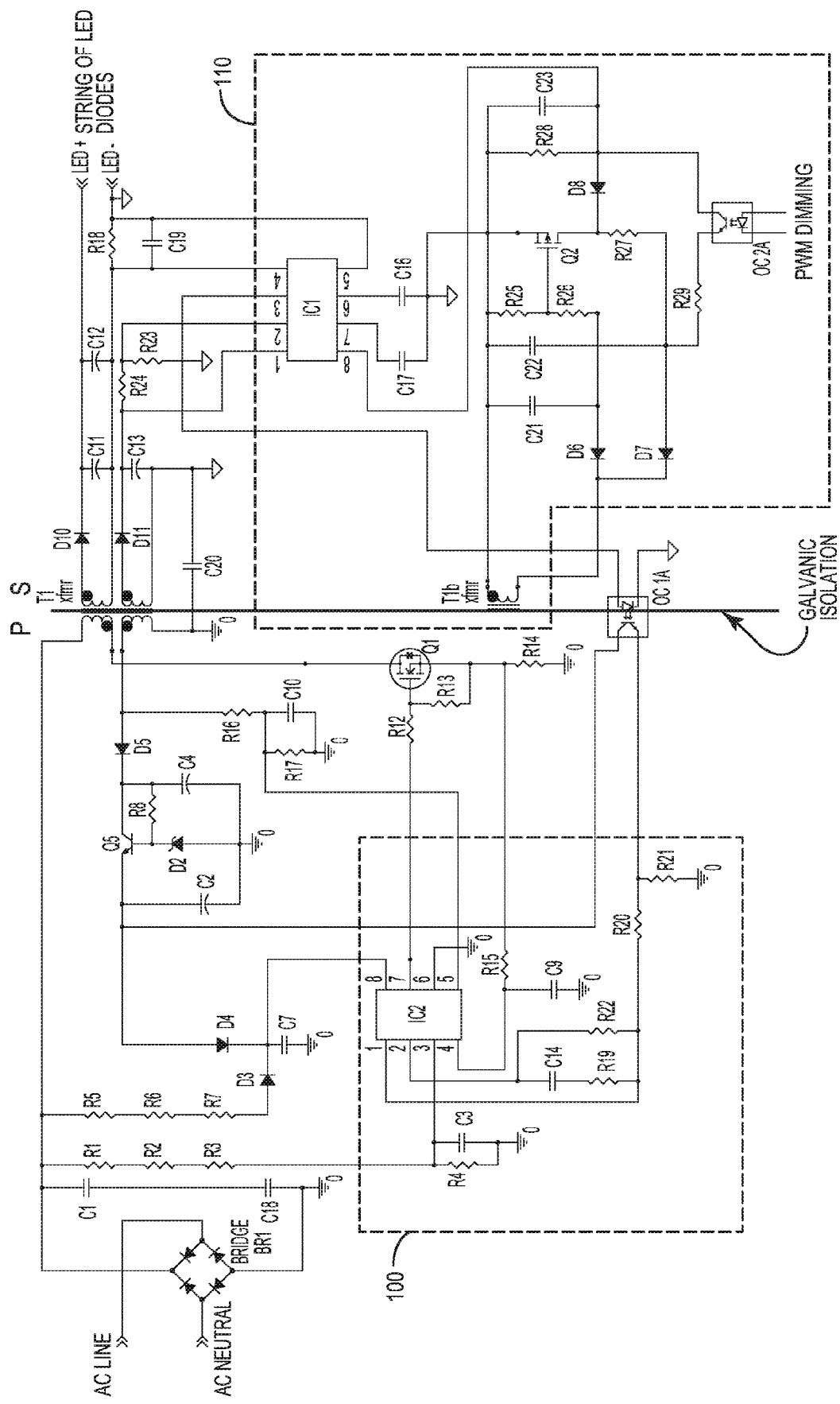
FIG. 1 illustrates a circuit diagram of an embodiment of an LED driver with dimming support.

FIG. 1 illustrates an embodiment of an LED driver with LED dimming support. The LED driver includes a transformer (T1) having a primary side (P) and a secondary side (S). The transformer provides galvanic isolation between the input (AC Line) and the output(LED+/LED−). The galvanic isolation is identified in FIG. 1 by the line labeled 'galvanic isolation'. The primary side of the transformer transfers energy to the secondary side responsive to an input signal, and the secondary side delivers output current to one or more LEDs at a magnitude corresponding to the amount of energy transferred to the secondary side. The LEDs controlled by the LED driver are not shown in FIG. 1, but can be connected to the output of the LED driver and are textually represented by the label 'string of LED diodes'. A current control loop 100 of the LED driver controls the current in the primary side of the transformer so that the output current of the LED driver equals a reference current signal.

A current adjustment circuit 110 of the LED driver injects a current adjustment signal into the current control loop 100 responsive to a phase-cut signal which removes a portion of the input signal. The phase-cut signal can be provided as part of the input signal, or provided separately. Either way, the phase-cut signal corresponds to the amount of desired LED dimming i.e. the more phase of the input signal being cut, the more dimming that is desired. The current adjustment signal is proportional to the amount of input voltage phase-cut. The current control loop 100 decreases the current in the primary side responsive to the current adjustment signal so that the brightness of each LED connected to the secondary side is decreased by an amount corresponding to the magnitude of the current adjustment signal.

In the embodiment shown in FIG. 1, the current adjustment circuit 110 is on the secondary side of the transformer and the current control loop 100 is on the primary side. The current adjustment circuit 110 includes a voltage-current regulator (IC1) and other passive and active components.

Figure 2:
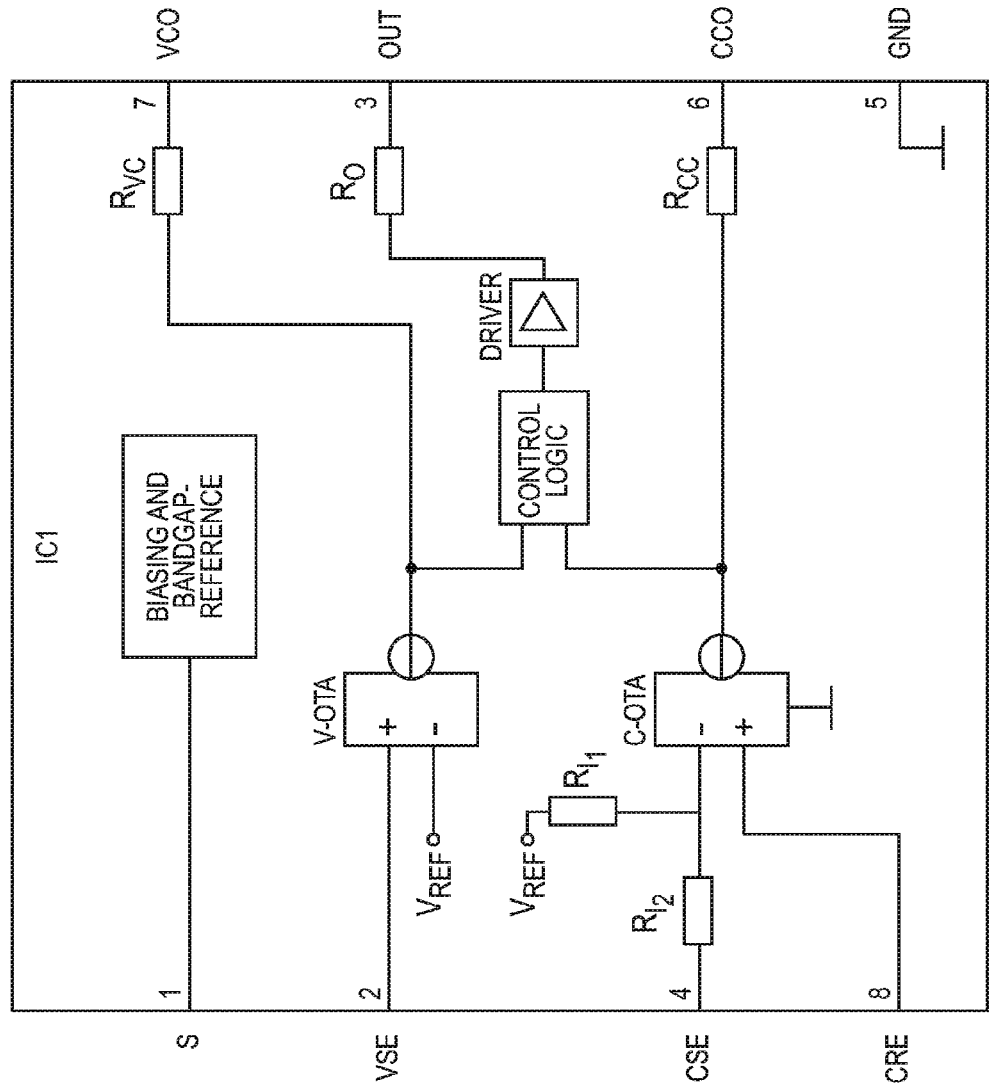
FIG. 2 illustrates a circuit diagram of an embodiment of a current adjustment circuit included in an LED driver for supporting dimming.

FIG. 2 illustrates an embodiment of the voltage-current regulator 101 included in the current adjustment circuit 110. According to this embodiment, the voltage-current regulator includes a high accuracy bandgap reference voltage provided by a biasing and bandgap reference circuit, a voltage error amplifier (V-OTA), a current error amplifier (C-OTA), and an output driver controlled by control logic. The inputs and outputs of the voltage-current regulator are as follows: S(1) is the supply voltage; VSE(2) is the voltage sense input; OUT(3) is the output; CSE(4) is the current sense input; GND(5) is ground reference potential; CCO(6) is the current compensation output; VCO(7) is the voltage compensation output; and CRE(8) is the C-OTA reference input. The output of V-OCA is connected to the VCO pin by a resistor $R_{VC}$, the output of the driver is connected to the OUT pin by a resistor $R_O$, and the output of C-OTA is connected to the CCO pin by a resistor $R_{CC}$.

The voltage error amplifier V-OTA compares the input voltage VSE to a reference voltage Vref. The difference is attenuated and proportional current drives the output. This feature is used as protection if the LED strings brakes.

The current error amplifier C-OTA compares the voltage at pin CRE to the voltage at the inverting input of C-OTA. The CSE pin is connected on the bottom of a shunt resistor ($R_{f2}$). Resistor $R_{f1}$ forms a voltage divider with $R_{f2}$. The CRE pin is grounded. The reference point (Vr) for current control with this configuration becomes:

$$Vr = V_{REF} * (R_{f2}/(R_{f1}+R_{f2})) \quad (1)$$

Current is measured by the CSE pin. The current error amplifier C-OTA adjusts the power supply so that the output current (lo) of the LED driver sensed at CSE matches the command value Vr/R18 (sense resistor). When the absolute value of the sensed output current (lo) of the LED driver times the sense resistor (R18) used to measure the output current is greater than the reference point Vr, the summary voltage is positive and the C-OTA generates current. This current is provided to the current control loop 100 on the primary side through an opto-coupler (OC1A), and functions as a command to the current control loop 100 to lower the output current provided to the LEDs. If Vr is not changed, the LED driver would provide constant output current. When Vr changes, the LED driver output current changes accordingly. LED dimming is introduced by varying Vr. In one embodiment, IC1 is voltage current regulator TLE4305 manufactured and sold by Infineon Technologies AG.

In FIG. 1, the current control loop 100 is connected to a main winding (T1 xfmr) of the secondary side through an opto-coupler (OC1A) and the voltage-current regulator IC1. The current adjustment circuit 110 is connected to an auxiliary winding (T1b xfmr) of the secondary side. The current control loop 100 controls the current in the primary side based on the difference between a reference current signal and the current adjustment signal received from the current adjustment circuit 110 via opto-coupler OC1A.

In addition to the voltage-current regulator IC1, the current adjustment circuit 110 further includes a resistor-capacitor (RC) network connected to the auxiliary winding on the secondary side, a MOSFET (Q2) connected to the auxiliary winding, a resistor R28 coupled in parallel with Q2, and a capacitor C23 coupled in parallel with Q2 and resistor R28. The RC network includes capacitors C21 and C22 and resistors R25 and R26. Resistors R25 and R26 form a voltage divider.

MOSFET Q2 of the current adjustment circuit 110 switches on and shorts resistor R28 and capacitor C23 when energy transfers from the primary side to the secondary side of the transformer. The size of capacitors C21 and C22 are chosen so that C22>>C21 and the RC network has a time constant which keeps MOSFET Q2 switched on during periodic pulses of the input signal when no phase-cut signal is present. As such, resistor R28 and capacitor C23 have no effect on the current control loop 100 when no phase-cut signal is present. When Q1 is switched off during non-phase-cut operation, the voltage across the terminals of the secondary side auxiliary winding (T1b xfmr) reverses which in turn causes current to flow through diodes D6 and D7, and charges capacitors C21, C22. Diodes D6 and D7 are reverse-biased when Q1 is switched on.

When a phase-cut signal is present, the RC network fully discharges C21 and C22 stays charged because C21*(R25+R26)<<C22*R27. In response, MOSFET Q2 switches off, enabling resistor R28 and capacitor C23 to generate the current adjustment signal with a magnitude corresponding to a duration (length) of the phase-cut signal.

MOSFET Q2 remains switched on and the current adjustment signal is fixed at a negligible value when no phase-cut signal is present, and MOSFET Q2 switches off and the current adjustment signal becomes non-negligible and variable when the phase-cut signal is present. The negative input of the current error amplifier C-OTA of the voltage-current regulator IC1 receives the current adjustment signal. The current error amplifier C-OTA provides constant current when the current adjustment signal is fixed (i.e. no phase-cutting) and variable current when the current adjustment signal is variable (i.e. phase-cutting is present).

The LED driver of FIG. 1 may further include an additional opto-coupler (OC2A) which is connected to resistor R28 at one end and coupled to capacitor C22 via resistor R29 at the other end. Opto-coupler OC2A receives a pulse width modulation dimming signal (PWM dimming) and injects an electrical equivalent of the pulse width modulation dimming signal into the current adjustment circuit 110. The current adjustment circuit 110 generates the current adjustment signal based on the electrical equivalent of the PWM dimming signal. Accordingly, either phase-cut or PWM-based LED dimming can be supported by the LED driver.

During operation of the LED driver shown in FIG. 1, resistors R5, R6, and R7, and diode D3 provide a start-up voltage Vcc at a controller IC (102) of the current control loop. In one embodiment, IC2 is boost controller TDA4863 manufactured and sold by Infineon Technologies AG. TDA4863 is a controller IC with high power factor and low THD (total harmonic distortion). Resistors R5, R6, and R7, and diode D3 charge capacitor C7. When the voltage reaches a suitably high value e.g. 13V, IC2 becomes operational. When IC2 is operational, the supply for Vcc is provided by the auxiliary winding (4,5) on the primary side, diode D5, and the linear regulator formed by capacitors C4 and C2, Zener diode D2, resistor R8, and MOSFET Q5. Diode D4 connects the linear regulator to Vcc. Diode D4 disconnects capacitor C2 during start-up, making start-up faster.

A voltage divider formed by resistors R16 and R17 and capacitor C10 enables critical conduction mode. When the voltage on pin 7 of IC2 crosses zero (i.e. current from the flyback transformer is discharged to the secondary side and oscillation occurs between the transformer magnetizing inductance and the parasitic capacitance of MOSFET Q1 and the transformer), IC2 turns on MOSFET Q1 which sets the current on the primary side.

A voltage divider formed by resistors R1, R2, R3, and R4, and capacitor C3 provides information about the input voltage (AC Line), which is received by a bridge rectifier (BR1) with reference to AC neutral. The divider ratio is preferably at least 100:1. Capacitor C3 is relatively small and the bandwidth of this filter is about 1 kHz, to filter noise. This signal is used by a multiplier to shape the input current. Capacitor C14 and resistors R19 and R22 shape the gain and phase in the current control loop 100. Controller IC2 includes an operational amplifier, and C14, R19 and R22 are placed around this operational amplifier. Resistor R21 converts the current from opto-coupler OC1A into voltage. Resistor R14 is a current sense resistor used for overcurrent protection and shaping the input current.

On the secondary side of the transformer, resistor R19 is a shunt resistor for sensing the output current (Io) which is used by voltage-current regulator IC1 as previously described herein. Capacitor C19 is a small filter on the current sense pin CSE of IC1. Resistors R23 and R24 form a voltage sense divider which is used together with the reference voltage and the current error amplifier C-OTA inside IC1 to provide overvoltage protection if the string of LEDs brakes.

Figure 3:
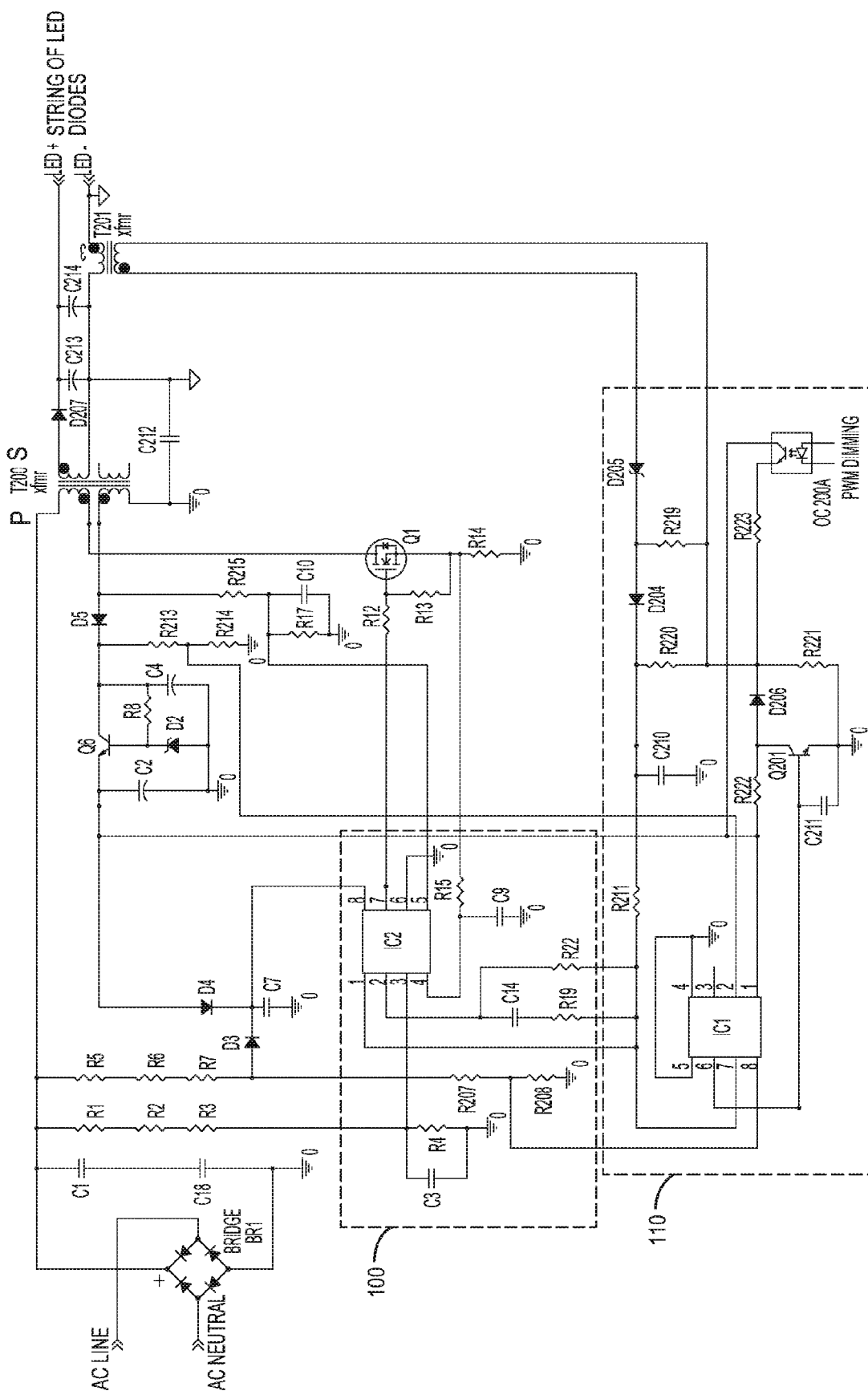
FIG. 3 illustrates a circuit diagram of another embodiment of an LED driver with dimming support.

FIG. 3 illustrates another embodiment of the LED driver. The embodiment shown in FIG. 3 is similar to the one shown in FIG. 1, however the current control loop 100 is connected to the primary side of the transformer and the current adjustment circuit 110 is connected to a current sense transformer (T201 xfmr) at the secondary side. The current sense transformer senses the output signal at the secondary side.

The current adjustment circuit includes a resistor-capacitor-diode (RCD) network according to this embodiment. The RCD network includes resistors R211, R219, R220, R221, R222, and R223, diodes D204 and D206, Zener diode D205, and capacitors C210 and C211. The RCD network generates the current adjustment signal. The current error amplifier (C-OTA) included in IC1 sees the voltage across capacitor C210, and resistor R219 provides information about the sensed output current (Io).

The current control loop 100 switches MOSFET Q201 on when no phase-cut signal is present and off when the phase-cut signal is present. MOSFET Q201 overrides the RCD network when switched on so that the current adjustment signal across capacitor C210 is fixed at a negligible value when no phase-cut signal is present. Otherwise, the RCD network generates the current adjustment signal as a function of the duration of the phase-cut. That is, the longer the duration of the phase-cut event, the larger the voltage across capacitor C210. The current adjustment circuit 110 adds the current adjustment signal to the output signal sensed by the current sense transformer and converted to a voltage by resistor R219. The current control loop 100 controls the current in the primary side via MOSFET Q1 so that the output current (Io) is proportional to the sum of the current adjustment signal and the output signal.

On the secondary side, diode D207 forward biases when MOSFET Q1 switches off and the polarity of the voltage across the secondary side winding reverses. Capacitors C213 and C214 are part of the filter that ensures the LEDs are properly loaded during operation.

During a phase-cut event, the output at pin 6 of IC1 is low and MOSFET Q201 does not conduct. As a result, diode D206 is forward-biased and resistors R222 and R221 cause a signal to be injected into the current control loop 100 in an amount proportional to the duration of the phase-cut. This signal is added to the sensed output current (Io), causing the current control loop 100 to correspondingly decrease the current at the primary side. When there is no phase-cutting of the input signal, the output at pin 6 of IC1 is high and MOSFET Q201 conducts so that diode D206 is reverse-biased and no current flows through resistors R221 and R222, in effect setting the current adjustment signal to zero.

Optional opto-coupler OC200A and resistor R223 can be provided for providing PWM-based LED dimming. In this case, the dimming signal is detected by the opto-coupler OC200A which generates a corresponding current. This current is added to the sensed output current (Io) via resistor R223, and compared with a reference current to reduce the primary side current if dimming is signaled as previously.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An LED driver, comprising:
a transformer having a primary side and a secondary side, the primary side operable to transfer energy to the secondary side responsive to an input signal and the secondary side operable to deliver output current to one or more LEDs at a magnitude corresponding to the amount of energy transferred to the secondary side;
a current control loop connected to a main winding of the secondary side and operable to control current in the primary side so that the output current equals a reference current signal;
a current adjustment circuit connected to an auxiliary winding of the secondary side and operable to inject a current adjustment signal into the current control loop responsive to a phase-cut signal which removes a portion of the input signal; and
an opto-coupler operable to receive a pulse width modulation dimming signal and inject an electrical equivalent of the pulse width modulation dimming signal into the current adjustment circuit,
wherein the current adjustment circuit is further operable to generate the current adjustment signal based on the electrical equivalent of the PWM dimming signal,
wherein the current control loop is further operable to decrease the current in the primary side responsive to the current adjustment signal so that a brightness of each LED connected to the secondary side is decreased by an amount corresponding to the magnitude of the current adjustment signal.

2. The LED driver according to claim 1, wherein the current adjustment signal is fixed at a negligible value when no phase-cut signal is present and variable when the phase-cut signal is present, and wherein the current control loop comprises a current error amplifier having a first input for receiving the reference current signal, a second input for receiving the current adjustment signal and an output operable to provide constant current when the current adjustment signal is fixed and variable current when the current adjustment signal is variable.

3. The LED driver according to claim 1, wherein the current adjustment circuit comprises a resistor-capacitor (RC) network connected to the auxiliary winding, a transistor connected to the auxiliary winding, a resistor coupled in parallel with the transistor, and a capacitor coupled in parallel with the transistor and the resistor, wherein the transistor is operable to switch on and short the resistor and the capacitor connected in parallel with the transistor when energy transfers from the primary side to the secondary side, wherein the RC network has a time constant which keeps the transistor switched on during periodic pulses of the input signal when no phase-cut signal is present, and wherein the RC network is operable to fully discharge when the phase-cut signal is present so that the transistor switches off and the resistor and capacitor connected in parallel with the transistor generate the current adjustment signal with a magnitude corresponding to a duration of the phase-cut signal.

4. The LED driver according to claim 2, wherein the output of the current control loop is coupled to the primary side through the opto-coupler.

5. The LED driver according to claim 2, wherein the current control loop is operable to control the current in the primary side based on the difference between the current adjustment signal and the reference current signal.

6. A method of operating an LED driver, the method comprising:
transferring energy from a primary side of a transformer to a secondary side of the transformer responsive to an input signal so that the secondary side delivers output current to one or more LEDs at a magnitude corresponding to the amount of energy transferred to the secondary side;
controlling current in the primary side by a current control loop so that the output current equals a reference current signal, the current control loop being connected to a main winding of the secondary side;
injecting a current adjustment signal into the current control loop responsive to a phase-cut signal which removes a portion of the input signal, the current adjustment signal being generated by a current adjustment circuit connected to an auxiliary winding of the secondary side;
decreasing the current in the primary side responsive to the current adjustment signal so that a brightness of each LED connected to the secondary side is decreased by an amount corresponding to the magnitude of the current adjustment signal;
receiving an optical pulse width modulation dimming signal;
injecting an electrical equivalent of the optical pulse width modulation dimming signal into the current adjustment circuit; and
generating the current adjustment signal based on the electrical equivalent of the PWM dimming signal.

7. The method according to claim 6, wherein the current adjustment signal is fixed at a negligible value when no phase-cut signal is present and variable when the phase-cut signal is present, and wherein the current control loop comprises a current error amplifier having a first input for receiving the reference current signal, a second input for receiving the current adjustment signal and an output for providing constant current when the current adjustment signal is fixed and variable current when the current adjustment signal is variable.

8. The method according to claim 6, wherein the current adjustment circuit comprises a resistor-capacitor (RC) network connected to the auxiliary winding, a transistor connected to the auxiliary winding, a resistor coupled in parallel with the transistor, and a capacitor coupled in parallel with the transistor and the resistor, and wherein injecting the current adjustment signal into the current control loop responsive to the phase-cut signal comprises:
keeping the transistor switched on via the RC network during periodic pulses of the input signal when no phase-cut signal is present so that the resistor and the capacitor coupled in parallel with the transistor are shorted and the current adjustment signal is fixed at a negligible value; and
fully discharging the RC network when the phase-cut signal is present to force the transistor off so that the resistor and capacitor connected in parallel with the transistor generate the current adjustment signal with a magnitude corresponding to a duration of the phase-cut signal.

9. The method according to claim 7, further comprising coupling the output of the current control loop to the primary side through an opto-coupler.

10. The method according to claim 7, further comprising controlling the current in the primary side based on the difference between the current adjustment signal and the reference current signal.

11. An LED driver, comprising:
- a transformer having a primary side and a secondary side, the primary side operable to transfer energy to the secondary side responsive to an input signal and the secondary side operable to deliver output current to one or more LEDs at a magnitude corresponding to the amount of energy transferred to the secondary side;
- a current sense transformer at the secondary side and operable to sense an output signal at the secondary side;
- a current control loop connected to the primary side and operable to control current in the primary side so that the output current equals a reference current signal; and
- a current adjustment circuit connected to the current sense transformer and operable to inject a current adjustment signal into the current control loop responsive to a phase-cut signal which removes a portion of the input signal,
- wherein the current control loop is further operable to decrease the current in the primary side responsive to the current adjustment signal so that a brightness of each LED connected to the secondary side is decreased by an amount corresponding to the magnitude of the current adjustment signal,
- wherein the current adjustment circuit is operable to add the current adjustment signal to the output signal sensed by the current sense transformer, and wherein the current control loop is operable to control the current in the primary side so that the output current is proportional to the sum of the current adjustment signal and the output signal,
- wherein the current adjustment circuit comprises a resistor-capacitor-diode (RCD) network operable to generate the current adjustment signal and a transistor connected to the RCD network, wherein the current control loop is operable to switch the transistor on when no phase-cut signal is present and off when the phase-cut signal is present, and wherein the transistor overrides the RCD network when switched on so that the current adjustment signal is fixed at a negligible value when no phase-cut signal is present.

12. A method of operating an LED driver, the method comprising:
- transferring energy from a primary side of a transformer to a secondary side of the transformer responsive to an input signal so that the secondary side delivers output current to one or more LEDs at a magnitude corresponding to the amount of energy transferred to the secondary side;
- controlling current in the primary side by a current control loop so that the output current equals a reference current signal, the current control loop being connected to the primary side;
- injecting a current adjustment signal into the current control loop responsive to a phase-cut signal which removes a portion of the input signal, the current adjustment signal being generated by a current adjustment circuit connected to a current sense transformer at the secondary side, the current adjustment circuit comprising a resistor-capacitor-diode (RCD) network for generating the current adjustment signal and a transistor connected to the RCD network;
- decreasing the current in the primary side responsive to the current adjustment signal so that a brightness of each LED connected to the secondary side is decreased by an amount corresponding to the magnitude of the current adjustment signal;
- sensing an output signal at the secondary side by the current sense transformer;
- adding the current adjustment signal to the output signal sensed by the current sense transformer;
- controlling the current in the primary side so that the output current is proportional to the sum of the current adjustment signal and the output signal;
- switching the transistor off when the phase-cut signal is present so that generation of the current adjustment signal by the RCD network is not overridden by the transistor; and
- switching the transistor on when no phase-cut signal is present to override the RCD network and fix the current adjustment signal at a negligible value.

* * * * *